(12) United States Patent
Luo et al.

(10) Patent No.: US 9,507,990 B2
(45) Date of Patent: Nov. 29, 2016

(54) TWO-DIMENSIONAL CODE RECOGNITION METHOD AND APPARATUS

(71) Applicant: TENCENT TECHNOLOGY (SHENZHEN) COMPANY LIMITED, Shenzhen, Guangdong (CN)

(72) Inventors: Wei Luo, Shenzhen (CN); Yanzi Zhu, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 15/002,571

(22) Filed: Jan. 21, 2016

(65) Prior Publication Data
US 2016/0140375 A1 May 19, 2016

Related U.S. Application Data

(63) Continuation of application No. PCT/CN2014/087462, filed on Sep. 25, 2014.

(30) Foreign Application Priority Data
Oct. 10, 2013 (CN) .......................... 2013 1 0470034

(51) Int. Cl.
*G06K 7/10* (2006.01)
*G06K 9/18* (2006.01)
*G06K 7/14* (2006.01)

(52) U.S. Cl.
CPC ............ *G06K 7/1443* (2013.01); *G06K 7/1417* (2013.01)

(58) Field of Classification Search
CPC ............ G06K 7/10; G06K 9/18; G06K 5/04; G06K 9/32; G06K 9/36; G06K 9/80; G06K 19/00; G06F 17/00; G08C 21/00
USPC ................. 235/462.09, 375, 462.08, 462.07, 235/462.1, 462.11, 487
See application file for complete search history.

(56) References Cited

U.S. PATENT DOCUMENTS

9,378,386 B1 * 6/2016 Saylor ................. G06F 21/6209
2007/0152058 A1 7/2007 Yeakley et al.
(Continued)

FOREIGN PATENT DOCUMENTS

| CN | 102034127 A | 4/2011 |
|---|---|---|
| CN | 102446264 A | 5/2012 |
| CN | 102880849 A | 1/2013 |

OTHER PUBLICATIONS

International Search Report in international application No. PCT/CN2014/087462, mailed on Jan. 6, 2015.
(Continued)

*Primary Examiner* — Edwyn Labaze
(74) *Attorney, Agent, or Firm* — Arent Fox LLP (57) ABSTRACT

The embodiments of the disclosure provide a two-dimensional code recognition method and associated apparatus. The two-dimensional code recognition method comprises steps of determining whether there is a picture displayed on a screen; determining whether the picture includes a two-dimensional code, when the picture is displayed on the screen; and identifying the two-dimensional code, when the picture includes the two-dimensional code. According to the disclosure only when determining the picture includes a two-dimensional code, the two-dimensional code is identified, and cameras are not required for the recognition of the local two-dimensional code picture.

10 Claims, 10 Drawing Sheets

(56) References Cited

U.S. PATENT DOCUMENTS

| | | | |
|---|---|---|---|
| 2009/0212113 A1* | 8/2009 | Chiu | G06K 7/14 235/462.41 |
| 2010/0074437 A1* | 3/2010 | Inami | H04N 1/0044 380/28 |
| 2012/0194320 A1 | 8/2012 | Yeakley et al. | |
| 2014/0097246 A1* | 4/2014 | Hu | G06K 19/06037 235/437 |
| 2014/0138442 A1* | 5/2014 | Wang | G06K 7/146 235/462.41 |
| 2014/0231502 A1* | 8/2014 | Marsico | G06Q 30/0203 235/375 |

OTHER PUBLICATIONS

English Translation of the Written Opinion of the International Search Authority in international application No. PCT/CN2014/087462, mailed on Jan. 6, 2015.

* cited by examiner

TWO-DIMENSIONAL CODE RECOGNITION METHOD AND APPARATUS

CROSS REFERENCE TO RELATED APPLICATIONS

This is a continuation application of International Patent Application No. PCT/CN2014/087462, filed on Sep. 25, 2014, which claims priority to Chinese Application No. 201310470034.2 filed on Oct. 10, 2013, the disclosure of which is incorporated by reference herein in its entirety.

FIELD OF THE INVENTION

The invention relates to graphics and image technology, particularly to a two-dimensional code recognition method and apparatus.

BACKGROUND

Two-dimensional codes, which are first used to track automobile parts, have been widely used for identification, security, shopping, and so on. The two-dimensional code, also known as two-dimensional barcode, is a graphic with a specific geometry, consisting of bar and empty (or black and white) parts arranged on a plane (two dimensions) according to certain rules to record data and symbol information. It has the advantages of large information capacity, large coding range, high fault-tolerance ability, good reliability of decoding, easy making and low cost, etc.

With the development of the Internet and the popularity of mobile devices, the applications of two-dimensional codes in mobile devices are increasing. Conventionally, two-dimensional codes are identified mainly by two-dimensional code recognition applications installed in the mobile devices. The user of the mobile device can operate its camera function to capture the two-dimensional code, and then the two-dimensional code recognition application can be used to identify the captured two-dimensional code to obtain rapidly the information stored in the two-dimensional code. A key to the Internet, data download, query and positioning, online payment and other functions can be achieved accordingly.

Conventionally, to capture the image of a two-dimensional code, a line type two-dimensional code is scanned a plurality of times through a line scanner, and a matrix type two-dimensional code is scanned through an image scanner. For example, the image of the matrix type two-dimensional code can be captured by calling the camera function of the mobile device. Then the two-dimensional code is identified primarily by positioning, segmentation and decoding. That is to say, the two-dimensional code is captured first by the user operating the camera function of the mobile device, then identified by the two-dimensional code recognition applications in the mobile devices, and consequently, the matrix type two-dimensional code is recognized.

The scanning process needs the camera which can only capture images for objects outside the device. However, there is no disclosure how to recognize the two-dimensional code when the image of the two-dimensional code cannot be obtained by cameras.

SUMMARY OF THE INVENTION

The embodiments of the disclosure provide a two-dimensional code recognition method and an associated apparatus.

According to an aspect of the invention, a two-dimensional code recognition method is provided, comprising:

determining whether there is a picture displayed on a screen;

determining whether the picture includes a two-dimensional code, when the picture is displayed on the screen; and identifying the two-dimensional code, when the picture includes the two-dimensional code.

According to another aspect of the invention, a two-dimensional code recognition apparatus is provided, comprising:

a first determining unit configured to determine whether there is a picture displayed on a screen;

a second determining unit configured to determine whether the picture includes a two-dimensional code, when the picture is displayed on the screen; and an identifying unit configured to identify the two-dimensional code, when the picture includes the two-dimensional code.

As can be seen from the above, embodiments of the present invention have the following advantages. Only when determining the picture includes a two-dimensional code, the two-dimensional code is identified, and cameras are not required for the recognition of the two-dimensional code.

DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

To clarify the purposes, solutions and advantages of the invention, the present invention will be described in further detail in conjunction with the following drawings. It should be understood that that the embodiments described below are merely parts of embodiments of the invention, rather than all embodiments of the invention. Based on these embodiments, other embodiments obtained by the skilled in the art without creative efforts all belong to the scope of the present invention.

Figure 1:
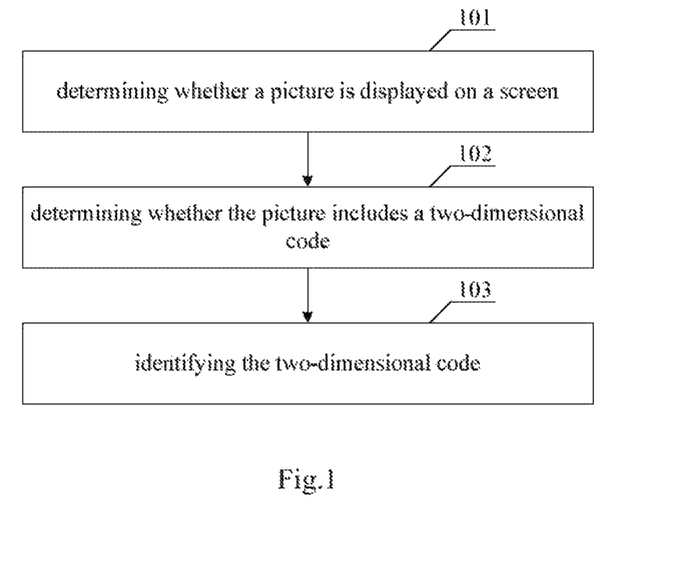
FIG. 1 is a flow chart of the method according to an exemplary embodiment of the present invention.

As shown in FIG. 1, embodiments of the invention provide a two-dimensional code recognition method.

According to an exemplary embodiment, at first, at step 101, it is to determine whether there is a picture displayed on a screen of a device. For example, when an application capable of reading pictures is started, the application is monitored to determine whether a picture is locally loaded and displayed. The device may include, but not limited to, mobile terminal devices, personal computers and others having a two-dimensional code recognition function.

When the picture is displayed on the screen, it is to determine whether the picture includes a two-dimensional code at step 102.

Full-screen scanning may be performed for the picture to determine whether the picture includes an area having bar code characteristics. It is determined that the picture includes a two-dimensional code if the picture includes an area having bar code characteristics; otherwise it is determined that the picture does not include a two-dimensional code. It should be noted that other ways may be employed to determine whether the picture includes a two-dimensional code.

When the picture includes the two-dimensional code, the two-dimensional code is identified at step 103.

The identifying step may comprise operations of positioning, segmentation and decoding for the local picture.

According to the embodiments of the invention, only when determining the picture includes a two-dimensional code, the two-dimensional code is identified. Cameras are not required for the recognition of the local two-dimensional code picture.

According to an exemplary embodiment of the invention, the positioning operation includes converting the local picture to a binary image, applying dilation operation to the binary image, and detecting the edge of the dilated binary image to obtain the profile of the bar code area of the two-dimensional code. The segmentation operation includes modifying and segmenting the profile to obtain a complete and standard bar code image. The decoding operation includes constructing a bitmap by grid sampling of the standard bar code image, i.e. sampling the image pixel on each crossing point of the grid, to obtain binary data of the bar code area. The binary data is corrected, translated and converted to obtain data code words. A threshold may be used to determine the sampled pixel is dark or light. The dark pixel of the bitmap can be represented by a binary "1", and the light pixel can be represented by a binary "0".

According to an exemplary embodiment of the invention, if it is determined that the local picture has a two-dimensional code, an operation option is displayed. And unless the option is chosen, the two-dimensional code is not identified. For example, a user may input an instruction by choosing the operation option to start identifying the two-dimensional code. Thereby, hardware resources can be saved.

In addition, the local picture may have two or more two-dimensional codes; however, the user may not be interested in all the two-dimensional codes. Thereby, according to an exemplary embodiment of the invention, options for choosing a two-dimensional code are displayed so that the user may choose which two-dimensional code(s) to be identified. These options may be shown in form of labels, such as "Previous" label or "Next" label. When the user chooses the "Previous" label, the two-dimensional code preceding the current two-dimensional code is chosen. When the user chooses the "Next" label, the two-dimensional code following the current two-dimensional code is chosen.

According to an exemplary embodiment of the invention, once the two-dimensional code of the local picture has been identified, the result is analyzed to determine what information is contained in the two-dimensional code. And the result may be also displayed. If it is determined that the result contains operation characteristic characters, operation entrances are provided for them. The operation characteristic characters refer to characters or character string(s) indicating operation objectives under predetermined rules, such as: web site, phone number and so on. For example, web site can provide the entrance for network, and the phone number can provide the entrance for the functions of copying and dialing. Accordingly, the user can perform various operations through the two-dimensional code conveniently.

In the above embodiments, during identifying, the positioning operation is directed to the entire local picture. According to an preferable embodiment, before positioning operation, an image area of barcode symbols of the two-dimensional code, i.e. the area having bar code characteristics is determined to reduce computation. For example, the image area may be chosen by the user through a select box. Then the image area with bar code symbols of the two-dimensional code is converted to a binary image, dilation operation is applied to the binary image, and the edge of the dilated binary image is detected to obtain the profile of the bar code area of the two-dimensional code. The profile is modified and segmented to obtain a complete and standard bar code image. A bitmap is constructed by grid sampling of the standard bar code image to obtain a binary data of the bar code area. The binary data is corrected, translated and converted to obtain data code words.

Since the image area with bar symbols of the two-dimensional code is determined before positioning operation, the amount of computation can be reduced, equipment resources can be saved and the efficiency of two-dimensional code recognition can be improved.

Furthermore, according to an exemplary embodiment of the invention, the local pictures include, but not limited to, pictures stored locally, or pictures received or downloaded from remote devices.

Three scenarios of the sources of the local pictures are further described as follows.

In the scenario that the local pictures are stored locally, for example, when a user is browsing pictures stored locally, the user may find a picture of a movie poster that contains a two-dimensional code. Then the user chooses the movie poster picture to perform the two-dimensional code recognition method to get the URL of the movie trailer.

In the scenario that the local pictures are received from remote devices, for example, when a user uses the QQ application, he might receive a friend addition request from other users. The friend addition request information may contain a picture with a two-dimensional code. The user may choose the picture to perform the two-dimensional code recognition method to get associated identity information.

In the scenario that the local pictures are downloaded from remote devices, for example, when a user is making online shopping via a mobile phone, he may download a picture of an item. If the picture contains a two-dimensional code, the user may choose the picture to perform the two-dimensional code recognition method to get associated information, for example price, of the item.

It should be noted that the above scenarios are only examples of the possible application of the two-dimensional code recognition method of the invention. The two-dimensional codes are widely used in today's society, and these examples should not be construed as limitation to the present invention.

Further, it is understood that data code words from the decoding operation may be operated to open a link, execute a program, or open a picture, and so on.

Figure 2:
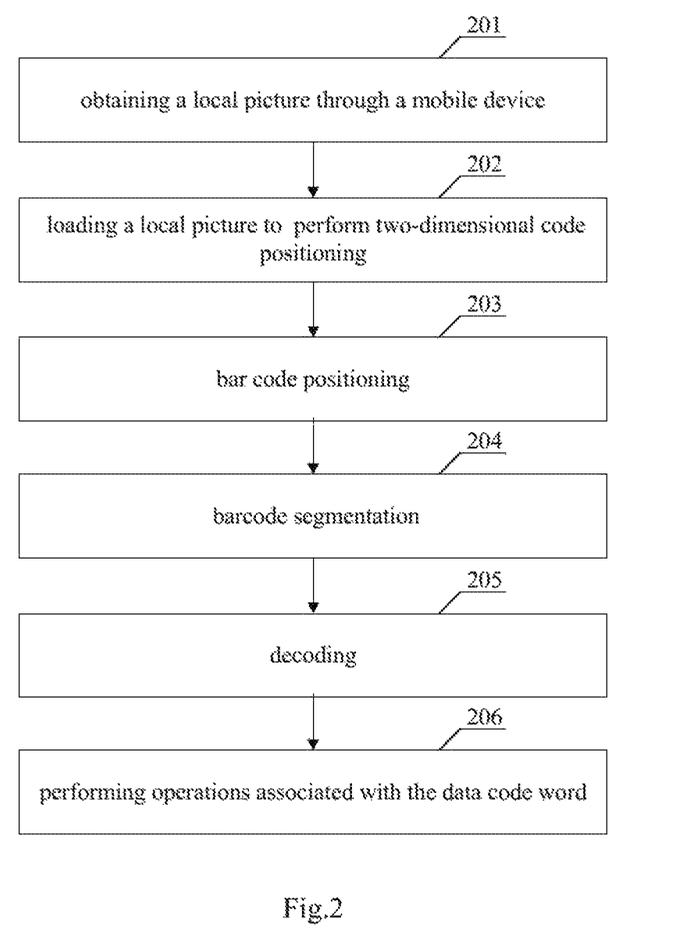
FIG. 2 is a flow chart of the method according to another exemplary embodiment of the present invention.

FIG. 2 shows another embodiment of a two-dimensional code recognition method of the invention. At step 201, a local picture is obtained through a mobile device, such as a mobile phone. For example, a user may receive a picture with a two-dimensional code through a mobile phone from another user. Alternatively, the user may store a picture with a two-dimensional code in a memory of his mobile phone when browsing web, microblog or other mobile application.

At step 202, browser or gallery is started to load a local picture and then the local picture is imported into a two-dimensional code recognition application. Then, for example, two-dimensional code positioning can be performed.

During the two-dimensional code positioning, it may be determined whether there is a two-dimensional code in the local picture and locate accurately the position of the two-dimensional code in the picture. When the local picture with a two-dimensional code is imported into a two-dimensional code recognition application, the two-dimensional code recognition application may perform full-screen scanning on the local picture and locate the area with bar code characteristics to determine an image area of the bar code symbols. The two-dimensional code positioning operation may be performed in an automatic mode. Alternatively, the two-dimensional code positioning operation may be performed in a manual mode via a two-dimensional code select box.

At step 203, bar code positioning, namely, edge detection is performed. The obtained image is converted into a binary image using threshold theory of point operations, i.e. performing binarization processing of the image. Then dilation operation is applied to the binary image and the edge of the dilated binary image is detected to obtain the profile of the area of the bar code.

At step 204, barcode segmentation is performed. After edge detection, the boundary of the profile of the bar code area needs to be modified and segmented to obtain a complete bar code area by the followings ways:

(1) Regional growth method is used to segment the bar code symbol, in order to modify the bar code symbol boundary. The regional growth method starts from a small area (seed) within the symbols, and modify the bar code boundary through regional growth, until all points within the symbols are included inside this boundary.

(2) Convex hull is used to segment the entire symbols.

(3) Regional growth and convex hull are performed alternatively. For those relatively large density barcodes, twice is enough, but for those relatively sparse barcodes, at least four times are required.

At step 205, decoding operation is performed. The bar code image is converted into data code words.

At step 206, operations associated with the data code word are performed. For different two-dimensional codes, the data code words are generally different, and hence operations associated with the data code words are also different. For example, if the data code word obtained by decoding the two-dimensional code is a Web site, a QQ browser can be called to open the Web site. If the data code word obtained by decoding the two-dimensional code is a picture, a picture viewer can be applied to open the picture.

Figure 3:
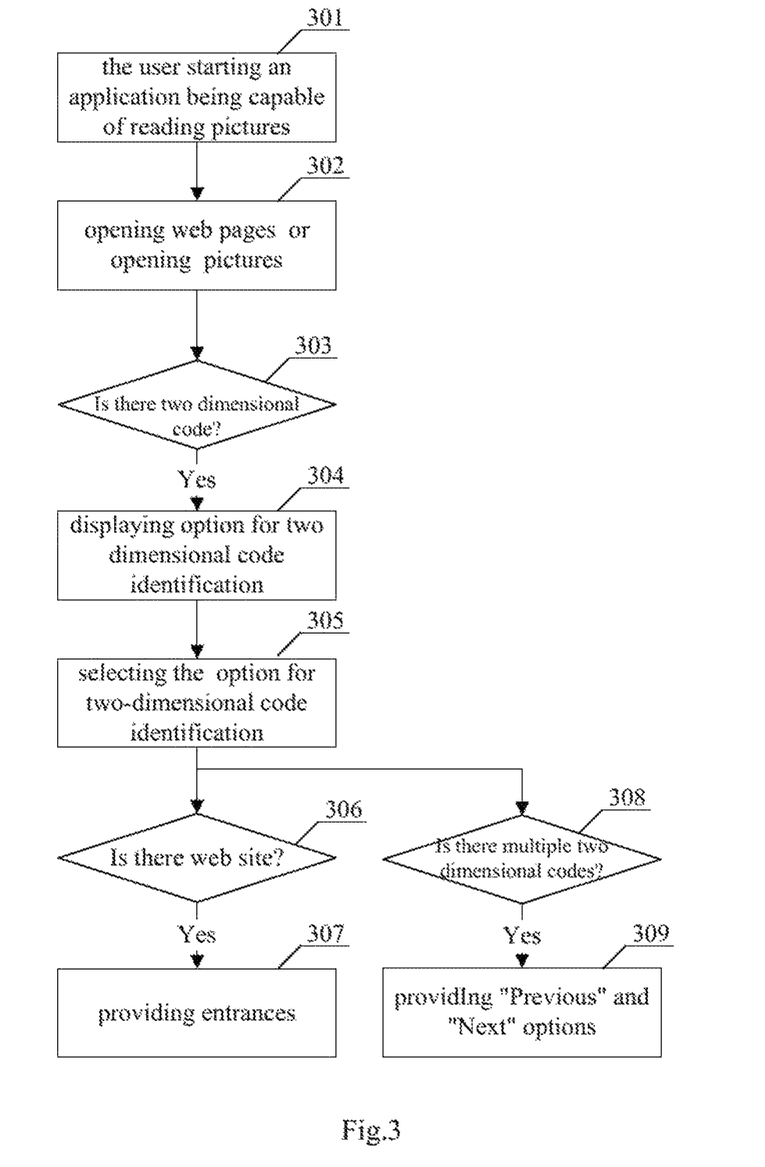
FIG. 3 is a flow chart of the method according to yet another exemplary embodiment of the present invention.

FIG. 3 shows another embodiment of a two-dimensional code recognition method of the invention.

At step 301, the user starts an application being capable of reading pictures.

The applications may include but not limited to browser, Gallery, etc.

At step 302, the user can open web pages with pictures or open directly pictures, with the application.

At step 303, it is to determine whether there is a two-dimensional code in the picture. If so, the process goes to step 304; otherwise, the process end.

At step 304, an operation option for two-dimensional code identification is displayed.

At step 305, in response to the user selecting the operation option for two-dimensional code identification, the two-dimensional code is identified and the result is displayed.

At step 306, it is to determine if there is web site or phone number in the result. If so, the process goes to step 307.

At step 307, entrances are provided to open a web site, dial phone number and add friends and so on.

At step 308, it is to determine if there are multiple two-dimensional codes in the picture. If so, the process goes to step 309.

At step 309, "Previous" and "Next" options are provided for the multiple two-dimensional codes. When the user chooses the "Previous" option, the two-dimensional code preceding the current two-dimensional code is chosen and the identification result is displayed. When the user chooses the "Next" option, the two-dimensional code following the current two-dimensional code is chosen and the identification result is displayed.

Figure 4:
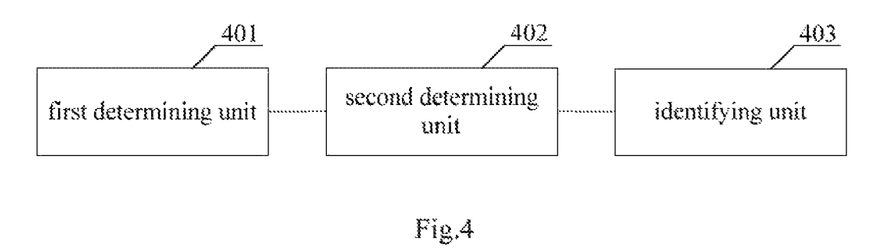
FIG. 4 is a schematic structural view of the apparatus according to an exemplary embodiment of the present invention.

As shown in FIG. 4, embodiments of the invention also provide a two-dimensional code recognition apparatus, including a first determining unit 401, a second determining unit 402, and an identifying unit 403.

The first determining unit 401 may determine whether there is a picture displayed on a screen of a device. For example, when an application capable of reading pictures is started, the application is monitored to determine whether a picture is locally loaded and displayed.

The second determining unit 402 may determine whether the picture includes a two-dimensional code, when the picture is displayed on the screen.

Full-screen scanning may be performed for the picture to determine whether the picture includes an area having bar code characteristics. It is determined that the picture includes a two-dimensional code if the picture includes an area having bar code characteristics; otherwise it is determined that the picture does not include a two-dimensional code. It should be noted that other ways may be employed to determine whether the picture includes a two-dimensional code.

The identifying unit 403 may identify the two-dimensional code, when the picture includes the two-dimensional code.

The identifying process may comprise operations of positioning, segmentation and decoding for the local picture.

According to the embodiments of the invention, only when determining the picture includes a two-dimensional code, the two-dimensional code is identified. Cameras are not required for the recognition of the local two-dimensional code picture.

Figure 5:
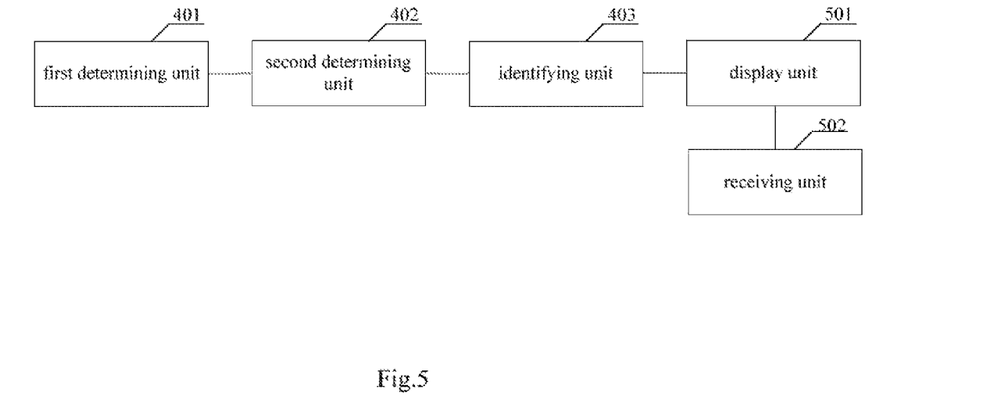
FIG. 5 is a schematic structural view of the apparatus according to another exemplary embodiment of the present invention.

According to an exemplary embodiment of the invention, the two-dimensional code recognition apparatus further comprises a display unit 501 and a receiving unit 502. When the local picture has a two-dimensional code, the display unit 501 displays an operation option. The receiving unit 502 receives an instruction input by a user through the operation option, wherein the instruction instructs identifying the two-dimensional code. The identifying unit 403 identifies the two-dimensional code when receiving the instruction. Thereby, hardware resources can be saved.

Figure 6:
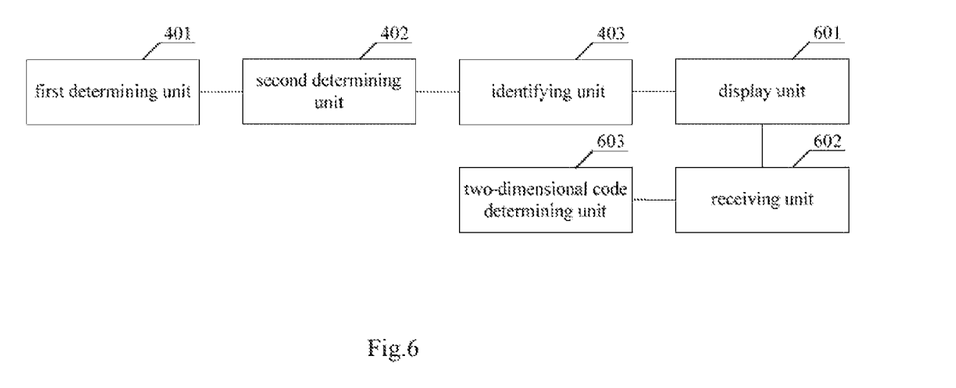
FIG. 6 is a schematic structural view of the apparatus according to yet another exemplary embodiment of the present invention.

In addition, the local picture may have two or more two-dimensional codes; however, the user may not be interested in all the two-dimensional codes. Thereby, according to an exemplary embodiment of the invention, as shown in FIG. 6, options for choosing two-dimensional code are displayed by a display unit 601 so that the user may choose which two-dimensional code(s) to be identified. The two-dimensional code recognition apparatus may further comprise a receiving unit 602 and a two-dimensional code determining unit 603. The receiving unit 602 may receive the instructions input by the user via the two-dimensional code choosing option. The two-dimensional code determining unit 603 may determine which two-dimensional code is to be identified according to the instruction.

These options may be shown in the form of labels, such as "Previous" label or "Next" label. When the user chooses the "Previous" label, the two-dimensional code preceding the current two-dimensional code is chosen. When the user chooses the "Next" label, the two-dimensional code following the current two-dimensional code is chosen.

Figure 7:
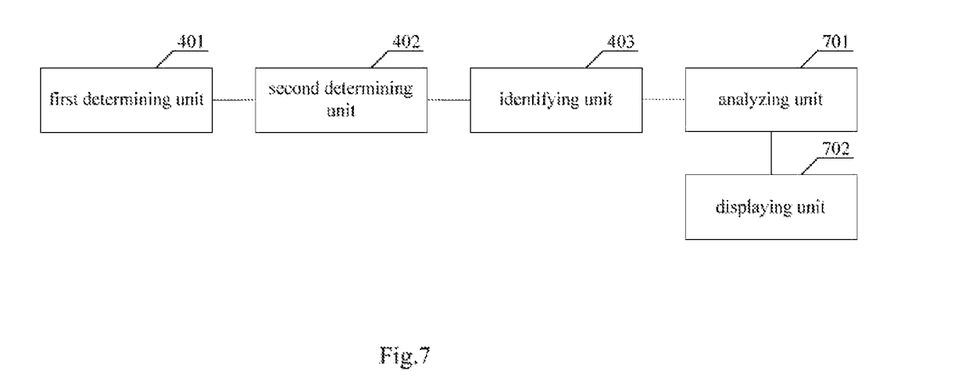
FIG. 7 is a schematic structural view of the apparatus according to yet another exemplary embodiment of the present invention.

According to an exemplary embodiment of the invention, as shown in FIG. 7, the two-dimensional code recognition apparatus may further comprise an analyzing unit 701 and a displaying unit 702. Once the two-dimensional code of the local picture has been identified, the analyzing unit 701 may analyze the result to determine what information is contained in the two-dimensional code. The displaying unit 702 may display the result and provide an operation entrance for operation characteristic characters if it is determined that the result contains operation characteristic characters. The operation characteristic characters refer to characters or character string(s) indicating operation objectives under predetermined rules, such as: web site, phone number and so on. For example, web site can provide the entrance for network, and the phone number can provide the entrance for the functions of copying and dialing. Accordingly, the user can perform various operations through the two-dimensional code conveniently.

In the above embodiments, during identifying, the positioning operation is directed to the entire local picture. According to a preferable embodiment, before positioning operation, an image area of barcode symbols of the two-dimensional code, i.e. the area having bar code characteristics is determined to reduce computation. For example, the image area may be chosen by the user through a select box. Then the image area with bar symbols of the two-dimensional code is converted to a binary image, dilation operation is applied to the binary image, and the edge of the dilated binary image is detected to obtain the profile of the bar code area of the two-dimensional code. The profile is modified and segmented to obtain a complete and standard bar code image. A bitmap is constructed by grid sampling of the standard bar code image to obtain a binary data of the bar code area. The binary data is corrected, translated and converted to obtain data code words.

Figure 8:
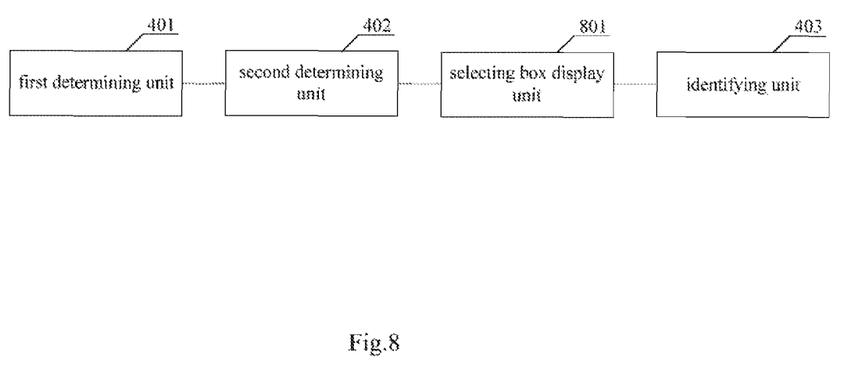
FIG. 8 is a schematic structural view of the apparatus according to yet another exemplary embodiment of the present invention.

As shown in FIG. 8, the two-dimensional code recognition apparatus may further comprise a selecting box display unit 801 to display the select box. The image area may be chosen by the user through the select box.

Since the image area with bar symbols of the two-dimensional code is determined before positioning operation, the amount of computation can be reduced, equipment resources can be saved and the efficiency of two-dimensional code recognition can be improved Furthermore, according to an exemplary embodiment of the invention, the local pictures include, but not limited to, pictures stored locally, or pictures received or downloaded from remote devices.

Three scenarios of the sources of the local pictures are further described as follows. In the scenario that the local pictures are stored locally, for example, when a user is browsing pictures stored locally, the user may find a picture of a movie poster that contains a two-dimensional code. Then the user chooses the movie poster picture to perform the two-dimensional code recognition method to get the URL of the movie trailer. In the scenario that the local pictures are received from remote devices, for example, when a user uses the QQ application, he might receive a friend addition request from other users. The friend addition request may contain a picture with two-dimensional code. The user may choose the picture to perform the two-dimensional code recognition method to get associated identity information. In the scenario that the local pictures are downloaded from remote devices, for example, when a user is making online shopping via a mobile phone, he may download a picture of an item. If the picture contains a two-dimensional code, the user may choose the picture to perform the two-dimensional code recognition method to get associated information, for example price, of the item.

It should be noted that the above scenarios are only examples of the possible application of the two-dimensional code recognition method of the invention. The two-dimensional codes are widely used in today's society, and these examples should not be construed as limitation to the present invention.

Figure 9:
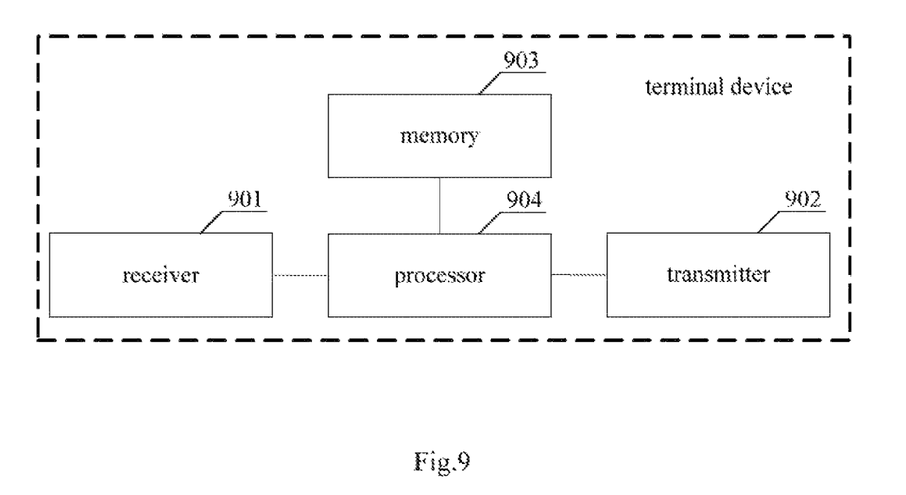
FIG. 9 is a schematic structural view of the terminal device according to an exemplary embodiment of the present invention.

As shown in FIG. 9, embodiments of the invention provide a terminal device, comprising a receiver 901, a transmitter 902, a memory 903 and a processor 904.

The processor 904 is configured to determine whether there is a picture displayed on a screen, determine whether the picture includes a two-dimensional code, when the picture is displayed on the screen and identify the two-dimensional code, when the picture includes the two-dimensional code.

Full-screen scanning may be performed for the picture to determine whether the picture includes an area having bar code characteristics. It is determined that the picture includes a two-dimensional code if the picture includes an area having bar code characteristics; otherwise it is determined that the picture does not include a two-dimensional code. It should be noted that other ways may be employed to determine whether the picture includes a two-dimensional code.

According to the embodiments of the invention, only when determining the picture includes a two-dimensional code, the two-dimensional code is identified. Cameras are not required for the recognition of the local two-dimensional code picture.

According to an exemplary embodiment of the invention, the processor 904 is further configured to display an operation option, if it is determined that the local picture has a two-dimensional code. And unless the option is chosen, the two-dimensional code is not identified. For example, a user may input an instruction by choosing the operation option to start identifying the two-dimensional code. Thereby, hardware resources can be saved.

In addition, the local picture may have two or more two-dimensional codes; however, the user may not be interested in all the two-dimensional codes. Thereby, according to an exemplary embodiment of the invention, the processor 904 is further configured to display options for choosing a two-dimensional code so that the user may choose which two-dimensional code(s) to be identified. These options may be shown in the form of labels, such as "Previous" label or "Next" label. When the user chooses the "Previous" label, the two-dimensional code preceding the current two-dimensional code is chosen. When the user chooses the "Next" label, the two-dimensional code following the current two-dimensional code is chosen.

According to an exemplary embodiment of the invention, the processor 904 is further configured to, once the two-dimensional code of the local picture has been identified, analyze the result to determine what information is contained in the two-dimensional code and/or display the result. If it is determined that the result contains operation characteristic characters, operation entrances are provided for them. The operation characteristic characters refer to characters or character string(s) indicating operation objectives under predetermined rules, such as: web site, phone number and so on. For example, web site can provide the entrance for network, and the phone number can provide the entrance for the functions of copying and dialing. Accordingly, the user can perform various operations through the two-dimensional code conveniently.

In the above embodiments, during identifying, the positioning operation is directed to the entire local picture. To reduce computation, according to an preferable embodiment, the processor 904 is further configured to, determine the image area of bar symbols of the two-dimensional code, i.e. the area having bar code characteristics. For example, the image area may be chosen by the user through a select box. Then the image area with bar symbols of the two-dimensional code is converted to a binary image, dilation operation is applied to the binary image, and the edge of the dilated binary image is detected to obtain the profile of the bar code area of the two-dimensional code. The profile is modified and segmented to obtain a complete and standard bar code image. A bitmap is constructed by grid sampling of the standard bar code image to obtain binary data of the bar code area. The binary data is corrected, translated and converted to obtain data code words.

Since the image area with bar symbols of the two-dimensional code is determined before positioning operation, the amount of computation can be reduced, equipment resources can be saved and the efficiency of two-dimensional code recognition can be improved.

Furthermore, according to an exemplary embodiment of the invention, the local pictures include, but not limited to, pictures stored locally, or pictures received or downloaded from remote devices.

The three scenarios of the sources of the local pictures are further described as follows. In the scenario that the local pictures are stored locally, for example, when a user is browsing pictures stored locally, the user may find a picture of a movie poster that contains a two-dimensional code. Then the user chooses the movie poster picture to perform the two-dimensional code recognition method to get the URL of the movie trailer. In the scenario that the local pictures are received from remote devices, for example, when a user uses the QQ application, he might receive a friend addition request from other users. The friend addition request may contain a picture with two-dimensional code. The user may choose the picture to perform the two-dimensional code recognition method to get associated identity information. In the scenario that the local pictures are downloaded from remote devices, for example, when a user is making online shopping via a mobile phone, he may download a picture of an item. If the picture contains a two-dimensional code, the user may choose the picture to perform the two-dimensional code recognition method to get associated information, for example price, of the item.

It should be noted that the above scenarios are only examples of the possible application of the two-dimensional code recognition method of the invention. The two-dimensional codes are widely used in today's society, and these examples should not be construed as limitation to the present invention.

Figure 10:
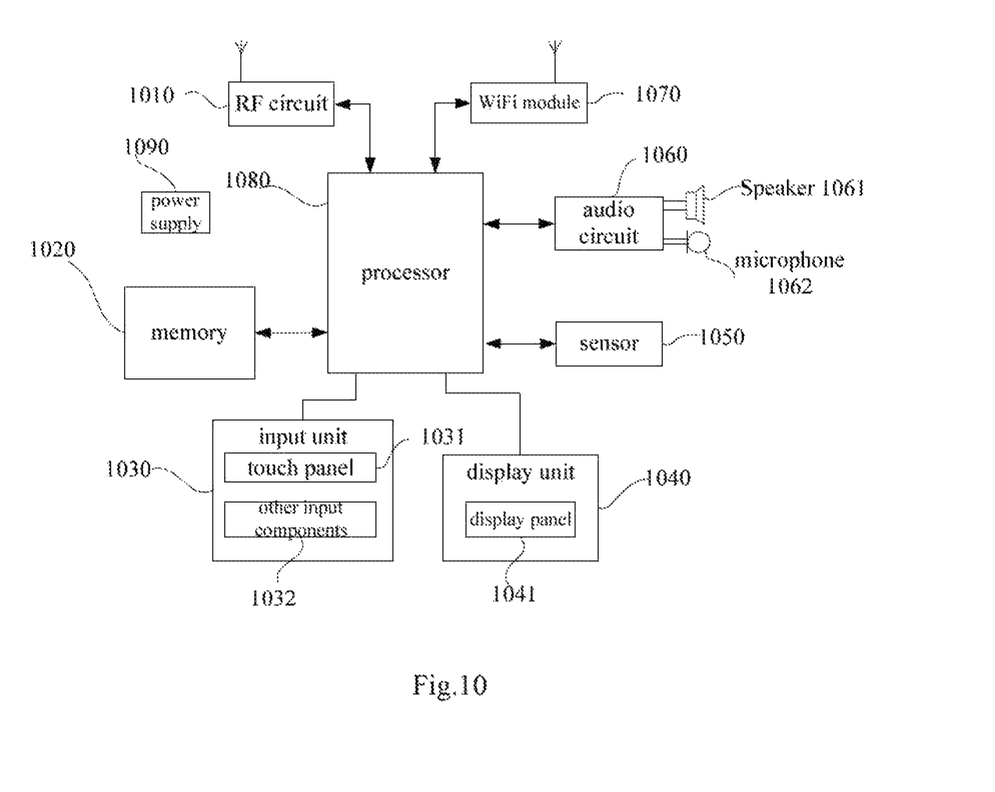
FIG. 10 is a schematic structural view of the terminal device according to another exemplary embodiment of the present invention.

As shown in FIG. 10, embodiments of the present invention also provide another terminal device. For clarity, only portions related to the embodiment of the present invention are illustrated. The device may include mobile phones, tablet PCs, PDA (Personal Digital Assistant), POS (Point of Sales), on-board computer and so on. In the following, mobile phones are taken as an example.

FIG. 10 is a block diagram showing a partial structure of the mobile phone provided according to an embodiment of the present invention. The mobile phone comprises a RF (Radio Frequency) circuit 1010, a memory 1020, an input unit 1030, a display unit 1040, a sensor 1050, audio circuit 1060, Wireless Fidelity (WiFi) module 1070, a processor 1080, and a power supply 1090 and other components. The skilled will appreciate that, the structure of the phone shown in FIG. 10 does not constitute a limitation on the phone, and the phone may include more or fewer components than shown.

The RF circuit 1010 may be used to receive and send information or signals. In particular, the RF circuit 1010 transmits the received downlink message from the base station to the processor 1080. Further, the RF circuit 1010 transmits the uplink data to the base station. Typically, the RF circuit 1010 includes, but not limited to, at least one amplifier, an antenna, a transceiver, a coupler, a low noise amplifier (LNA), a diplexer and so on. In addition, the RF circuit 1010 may communicate with networks and other devices by wireless communication. The wireless communication may use any communication standard or protocol, including, but not limited to, Global System of Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS) and the like.

Memory 1020 can be used to store software programs and modules. The processor 1080 may run software programs and modules in memory 1020 to perform various functions of mobile phones and data processing. The memory 1020 may mainly include a program storage area and a data storage area. The program storage area may store an operating system, at least one application required for the functions (such as sound play, image play, etc.). The data storage area may store the data created by the use of mobile phones (such as audio data, phone book, etc.). Furthermore, memory 1020 may include high-speed random access memory or non-volatile memory, such as at least one of disk storage, flash memory, or other volatile solid-state memory.

The input unit 1030 may receive number or character information, and generate key signal input associated with mobile phone user settings and function control. Specifically, the input unit 1030 may include a touch panel 1031, and other input components 1032. Touch panel 1031, also known as touch screen, can collect user operation on or near the touch panel (such as the user operations on or near the touch panel 1031 using a finger, stylus, and any other suitable object or accessories), and drive corresponding components according to a preset program. Alternatively, the touch panel 1031 may include a touch detector and a touch controller. Wherein the touch detector detects the touch position of the user, creates detection signals caused by the touch operation, and transmits the signals to the touch controller. The touch controller receives touch information from the touch detector, converts it into contact coordinates, and sends the coordinates to the processor 1080. The touch controller also receives commands from the processor 1080. Further, the touch panel 1031 can be resistive, capacitive, infrared and surface acoustic wave, etc. In addition to the touch panel 1031, the input unit 1030 may also include other input components 1032. Specifically, the other input components 1032 may include, but are not limited to, one or more of the physical keyboard, function keys (such as volume control keys, key switches, etc.), a trackball, a mouse, an operating lever or others.

The display unit 1040 may display information input by the user or information provided to the user, as well as various menus. The display unit 1040 includes a display panel 1041 which may include, for example, a liquid crystal display (LCD), an organic light emitting diode (OLED). Further, the touch panel 1031 may be positioned on the display panel 1041. When the touch panel 1031 detects touch operations on or near it, it will notify the processor 1080 to determine the type of the touch event. Then the processor 1080 provides visual output on the display panel 1041 according to the touch event type. Although in FIG. 10, two separate components of the touch panel 1031 and the display panel 1041 are used to achieve the function of input and output for mobile phones, but in some embodiments, the touch panel 1031 may be integrated with the display panel 1041 to achieve the function of input and output for mobile phones.

The phone may further include at least one sensor 1050, such as light sensors, motion sensors and other sensors. Specifically, the optical sensor may include an ambient light sensor and/or a proximity sensor. The ambient light sensor may adjust the brightness of the display panel 1041 according to the brightness of ambient light, and the proximity sensor may close the display panel 1041 and/or backlight when the phone is moved close to the ear. As a motion sensor, the acceleration sensor can detect the magnitude of acceleration in each direction (typically axis) and detect the magnitude and direction of gravity when stationary, to identify the phone posture applications (such as horizontal and vertical screen switching, games, magnetometer calibration) and identify relevant vibration function (such as a pedometer, percussion) and the like. The mobile phone can also include other sensors, such as a gyroscope, a barometer, a hygrometer, a thermometer, or an infrared sensor.

The audio circuit 1060, speaker 1061 and microphone 1062 can provide an audio interface between the user and the phone. The audio circuitry 1060 may convert received audio data into electrical signal, and transmit the electrical signal to the speaker 1061. The speaker 1061 can convert the electrical signal to sound signal. On the other hand, the microphone 1062 can convert received sound signal into an electric signal, which is received by the audio circuit 1060. The audio circuit 1060 can convert the received electric signal into audio data and transmit the audio data to the processor 1080. The processor 1080 can process the audio data and transmit processed audio data to the RF circuit 1010. Finally, the audio data may be transmitted to another mobile phone or the audio data may be output to the memory 1020.

WiFi is of short-range wireless transmission technology. The WiFi module 1070 can help users to send and receive email, browse the web and access streaming media etc. It provides users with wireless broadband Internet access. Although FIG. 10 shows a WiFi module 1070, it should be understood that the mobile phone may or may not include the WiFi module 1070.

The processor 1080 is the control center of the phone. It can use a variety of interfaces and lines for connecting various parts of the phone, run or execute software program and/or modules stored in the memory 1020, and call data stored in the memory 1020, so as to perform various functions and data processing and monitor the phone. Alternatively, the processor 1080 may include one or more processing units. Preferably, the processor 1080 may be integrated with the application processor and the modem processor. The application processor mainly copes with operating system, user interfaces and applications and so on. The modem processor mainly copes with wireless communication. It should be understood that the modem processor may also not be integrated with the processor 1080.

The phone also includes a power supply 1090 (such as batteries) providing power to other parts of the phone. Preferably, the power supply is logically connected to the processor 1080 through a power management system to achieve charging management, discharging management and power management.

Although not shown, the phone may also include a camera, a Bluetooth module, and so on.

The processor 1080 may be configured to determine whether there is a picture displayed on a screen, determine whether the picture includes a two-dimensional code, when the picture is displayed on the screen and identify the two-dimensional code, when the picture includes the two-dimensional code.

Full-screen scanning may be performed for the picture to determine whether the picture includes an area having bar code characteristics. It is determined that the picture includes a two-dimensional code if the picture includes an area having bar code characteristics; otherwise it is determined that the picture does not include a two-dimensional code. It should be noted that other ways may be employed to determine whether the picture includes a two-dimensional code.

According to the embodiments of the invention, only when determining the picture includes a two-dimensional code, the two-dimensional code is identified. Cameras are not required for the recognition of the local two-dimensional code picture.

According to an exemplary embodiment of the invention, the processor 1080 is further configured to display an operation option, if it is determined that the local picture has a two-dimensional code. And unless the option is chosen, the two-dimensional code is not identified. For example, a user may input an instruction by choosing the operation option to start identifying the two-dimensional code. Thereby, hardware resources can be saved.

In addition, the local picture may have two or more two-dimensional codes; however, the user may not be interested in all the two-dimensional codes. Thereby, according to an exemplary embodiment of the invention, the processor 1080 is further configured to display options for choosing two-dimensional code so that the user may choose which two-dimensional code(s) to be identified. These options may be shown in the form of labels, such as "Previous" label or "Next" label. When the user chooses the "Previous" label, the two-dimensional code preceding the current two-dimensional code is chosen. When the user chooses the "Next" label, the two-dimensional code following the current two-dimensional code is chosen.

According to an exemplary embodiment of the invention, the processor 1080 is further configured to, once the two-dimensional code of the local picture has been identified, analyze the result to determine what information is contained in the two-dimensional code and/or display the result. If it is determined that the result contains operation characteristic characters, operation entrances are provided for them. The operation characteristic characters refer to characters or character string(s) indicating operation objectives under predetermined rules, such as: web site, phone number and so on. For example, web site can provide the entrance for network, and the phone number can provide the entrance for the functions of copying and dialing. Accordingly, the user can perform various operations through the two-dimensional code conveniently.

In the above embodiments, during identifying, the positioning operation is directed to the entire local picture. To reduce computation, according to an preferable embodiment, the processor 1080 is further configured to, determine the image area of bar symbols of the two-dimensional code, i.e. the area having bar code characteristics. For example, the image area may be chosen by the user through a select box. Then the image area with bar symbols of the two-dimensional code is converted to a binary image, dilation operation is applied to the binary image, and the edge of the dilated binary image is detected to obtain the profile of the bar code area of the two-dimensional code. The profile is modified and segmented to obtain a complete and standard bar code image. A bitmap is constructed by grid sampling of the standard bar code image to obtain binary data of the bar code area. The binary data is corrected, translated and converted to obtain data code words.

Since the image area with bar symbols of the two-dimensional code is determined before positioning operation, the amount of computation can be reduced, equipment resources can be saved and the efficiency of two-dimensional code recognition can be improved.

Furthermore, according to an exemplary embodiment of the invention, the local pictures include, but not limited to, pictures stored locally, or pictures received or downloaded from remote devices.

The three scenarios of the sources of the local pictures are further described as follows. In the scenario that the local pictures are stored locally, for example, when a user is browsing pictures stored locally, the user may find a picture of a movie poster that contains a two-dimensional code. Then the user chooses the movie poster picture to perform the two-dimensional code recognition method to get the URL of the movie trailer. In the scenario that the local pictures are received from remote devices, for example, when a user uses the QQ application, he might receive a friend addition request from other users. The friend addition request may contain a picture with two-dimensional code. The user may choose the picture to perform the two-dimensional code recognition method to get associated identity information. In the scenario that the local pictures are downloaded from remote devices, for example, when a user is making online shopping via a mobile phone, he may download a picture of an item. If the picture contains a two-dimensional code, the user may choose the picture to perform the two-dimensional code recognition method to get associated information, for example price, of the item.

It should be noted that the above scenarios are only examples of the possible application of the two-dimensional code recognition method of the invention. The two-dimensional codes are widely used in today's society, and these examples should not be construed as limitation to the present invention.

Notably, in the above-described embodiments of the apparatus and terminal device, the units are divided only in accordance with the logic function, but not limited to the above division. Further, the specific names for each functional unit are used to only to facilitate distinguishing from each other, not intended to limit the scope of the present invention.

Further, the skill in the art could understand that all or part of the steps of the above-described method embodiments may be implemented by program instruction relevant hardware. The corresponding program may be stored in a non-transitory computer readable storage medium. The storage medium may be a read-only memory, magnetic or optical disks and so on.

The above described embodiments are merely preferred embodiments of the invention, but not intended to limit the invention. Any modifications, equivalent alternations and improvements that are made within the spirit and scope of the invention should be included in the protection scope of the invention.

What is claimed is:

1. A two-dimensional code recognition method, comprising:
    determining whether a picture is displayed on a screen;
    determining whether the picture includes a two-dimensional code, when the picture is displayed on the screen; and
    identifying the two-dimensional code, when the picture includes the two-dimensional code,
    wherein identifying the two-dimensional code comprises:
    determining an image area with bar code symbols of the two-dimensional code,
    wherein identifying the two-dimensional code further comprises:
    converting the image area with bar code symbols of the two-dimensional code to a binary image,
    applying dilation operation to the binary image, and
    detecting an edge of the dilated binary image to obtain a profile of a bar code area of the two-dimensional code;
    modifying and segmenting the profile to obtain a complete and standard bar code image;
    constructing a bitmap by grid sampling of the standard bar code image to obtain a binary data of the bar code area; and
    correcting, translating and converting the binary data to obtain a data code word.

2. The method of claim 1, further comprising:
    displaying an operation option when the picture includes the two-dimensional code; and
    receiving an instruction input by a user through the operation option, wherein the instruction instructs identifying the two-dimensional code.

3. The method of claim 1, wherein the picture comprises two or more two-dimensional codes, the method further comprising:
    displaying a two-dimensional code choosing option;
    receiving an instruction input by a user via the two-dimensional code choosing option; and determining which two-dimensional code is to be identified according to the instruction.

4. The method of claim 1, further comprising:
analyzing the identified two-dimensional code; and
displaying the identified two-dimensional code, and when the identified two-dimensional code contains operation characteristic characters, providing an operation entrance for the operation characteristic characters.

5. The method of claim 1, wherein the image area is determined by a user using a select box.

6. A two-dimensional code recognition apparatus, comprising:
   a first determining unit configured to determine whether a picture is displayed on a screen;
   a second determining unit configured to determine whether the picture includes a two-dimensional code, when the picture is displayed on the screen; and
   an identifying unit configured to identify the two-dimensional code, when the picture includes the two-dimensional code,
   wherein identifying the two-dimensional code comprises:
   determining an image area with bar code symbols of the two-dimensional code,
   wherein identifying the two-dimensional code further comprises:
   converting the image area with bar code symbols of the two-dimensional code to a binary image,
   applying dilation operation to the binary image, and
   detecting an edge of the dilated binary image to obtain a profile of a bar code area of the two-dimensional code;
   modifying and segmenting the profile to obtain a complete and standard bar code image;
   constructing a bitmap by grid sampling of the standard bar code image to obtain a binary data of the bar code area; and
   correcting, translating and converting the binary data to obtain a data code word.

7. The apparatus of claim 6, further comprising:
   a display unit configured to display an operation option when the picture includes the two-dimensional code; and
   a receiving unit configured to receive an instruction input by a user through the operation option, wherein the instruction instructs identifying the two-dimensional code.

8. The apparatus of claim 6, wherein the picture comprises two or more two-dimensional codes, the apparatus further comprising:
   a display unit configured to display a two-dimensional code choosing option;
   a receiving unit configured to receive an instruction input by a user via the two-dimensional code choosing option; and
   a third determining unit configured to determine which two-dimensional code is to be identified according to the instruction.

9. The apparatus of claim 6, further comprising:
   an analyzing unit configured to analyze the identified two-dimensional code;
   a displaying unit configured to display the identified two-dimensional code and provide an operation entrance for operation characteristic characters when the identified two-dimensional code contains the operation characteristic characters.

10. The apparatus of claim 6, wherein the image area is determined by a user using a select box.

* * * * *